W. O. WORTH.
EXPLOSIVE ENGINE.
APPLICATION FILED NOV. 21, 1906.

907,669.

Patented Dec. 22, 1908.
6 SHEETS—SHEET 1.

W. O. WORTH.
EXPLOSIVE ENGINE.
APPLICATION FILED NOV. 21, 1906.

907,669.

Patented Dec. 22, 1908.

WITNESSES
INVENTOR
William O. Worth

UNITED STATES PATENT OFFICE.

WILLIAM O. WORTH, OF EVANSVILLE, INDIANA.

EXPLOSIVE-ENGINE.

No. 907,669.  Specification of Letters Patent.  Patented Dec. 22, 1908.

Application filed November 21, 1906. Serial No. 344,429.

*To all whom it may concern:*

Be it known that I, WILLIAM O. WORTH, a citizen of the United States, and a resident of the city of Evansville, in the county of Vanderburg and State of Indiana, have invented certain new and useful Improvements in Explosive-Engines; and I do hereby declare that the following is a full, clear, and exact description of the same, reference being had to the accompanying drawings, and to the letters of reference marked thereon, which form a part of this specification.

This invention relates to improvements in explosive engines and more particularly to that class of explosive engines set forth in the prior joint application for patent of John D. Worth and myself filed on the 4th day of June 1906, Serial No. 320,022. In said application for patent the operation of the engine is controlled and in part regulated by the graduation of the charge delivered into the cylinder, the excess charge in one cylinder being permitted to escape to another before compression, an automatic governor controlling the closing of the inlet ports to effect that result.

The object of this invention is to provide in an engine of the class described a simple actuating mechanism for the inlet and exhaust valves, which actuates the exhaust valve without variation, but which automatically varies the period of inlet opening to permit excess charge to escape from the cylinder about to undergo compression, into the cylinder next to receive compression, thus economizing in the consumption of the explosive mixture and at the same time affording an automatically controlled engine regulated in speed by its consumption of the mixture.

It is a further object of the invention to afford in connection with an engine of the class described a simple arrangement whereby the operator may vary the speed at will to suit the power requirements of the load, but in which the engine will otherwise run at uniform speed.

It is an object of the invention also, to afford simple mechanism whereby the inlet valve of the cylinder just to receive compression is held open for a period dependent upon the speed requirements of the engine, thereby enabling the inlet ports of two cylinders, to be open at the same time, permitting displacement of the mixture from one to the other cylinder.

It is a further object of the invention to afford a convenient access to the valve actuating means.

The invention consists in the matters hereinafter described and more fully pointed out and defined in the appended claims.

As shown in the drawings: a four cylinder, four cycle explosion or internal combustion engine is indicated though obviously any desired number of cylinders may be used. The cylinders A—A'—A² and A³ are connected as usual on any suitable base B which affords the upper portion of the crank case and the bottom of which is afforded by a removable section B' rigidly bolted to the flanged bottom of the base B. The crank shaft C constructed as usual extends longitudinally of the crank case and is provided on its outer end with a balance wheel C'.

The cylinders, as shown, are water jacketed for the purposes of cooling, but, of course, may be cooled in any suitable manner. Provided on one side of each cylinder is a compression chamber into which the inlet valve $d$ and from which the exhaust valve $e$ opens. All the exhaust valves discharge to the same exhaust pipe D and all the inlet valves open from the same inlet pipe E. Said inlet and exhaust pipes are of course connected with a suitable carbureter and muffler respectively. Said valves, as shown, are simple puppet valves, the stems $d'$—$e'$ of which extend downwardly through the inlet and exhaust chambers respectively and are provided at their lower end with strong compression springs $d^2$—$e^2$, the tension of which is adjusted by means of a nut $d^3$ or $e^3$ and cotter pins $d^4$ or $e^4$, on each stem. A relatively large aperture is provided in the top of the crank case for each stem and seated therein, is a cylindric tubular casing $b^4$—$b^5$ flanged to extend over the crank case around said apertures and are rigidly secured in place by means of clamps F, which engage between adjacent casings and are bolted to the crank case. At its lower end the bore in each tubular casing is enlarged to receive the enlarged end of the puppet rods D²—E² for the valves which extend in alinement with and engage the exhaust and the inlet valve stems respectively.

Figure 1:
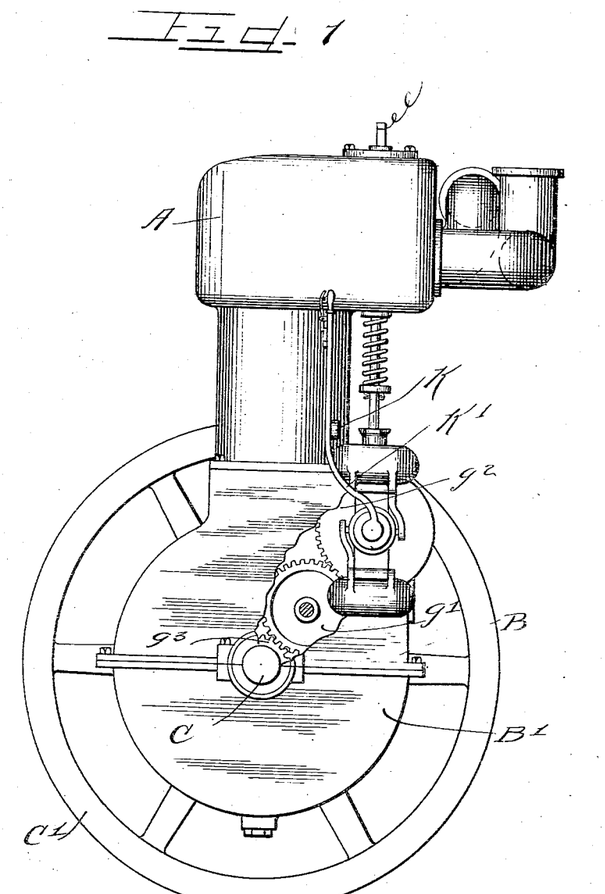
Figure 1 is an end elevation partly broken of an engine embodying my invention.
Figure 2:
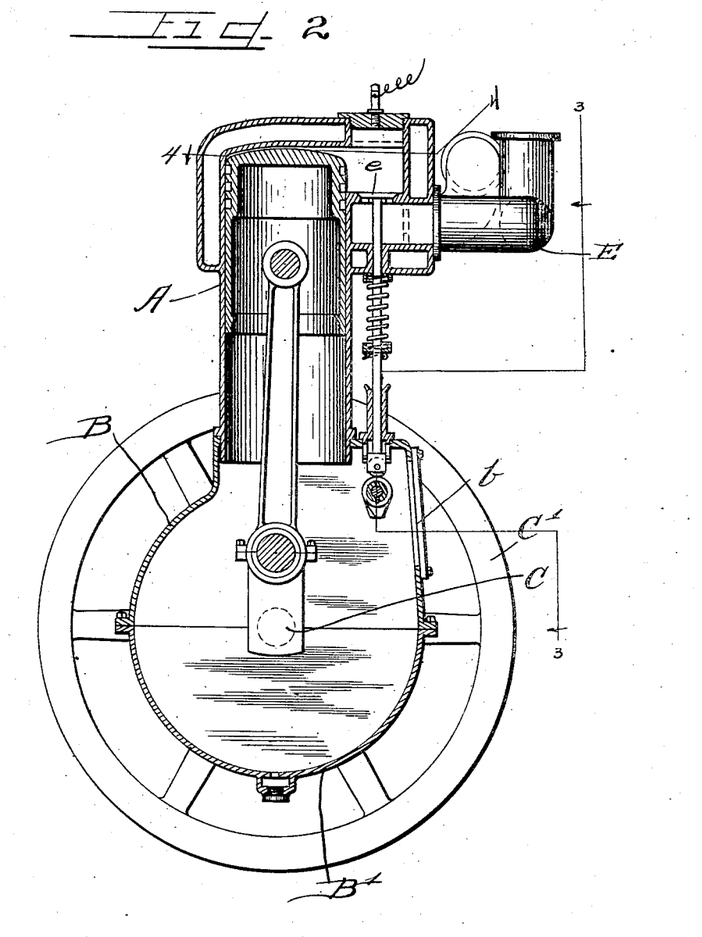
Fig. 2 is a vertical section thereof taken at one of the inlet valves.
Figure 3:
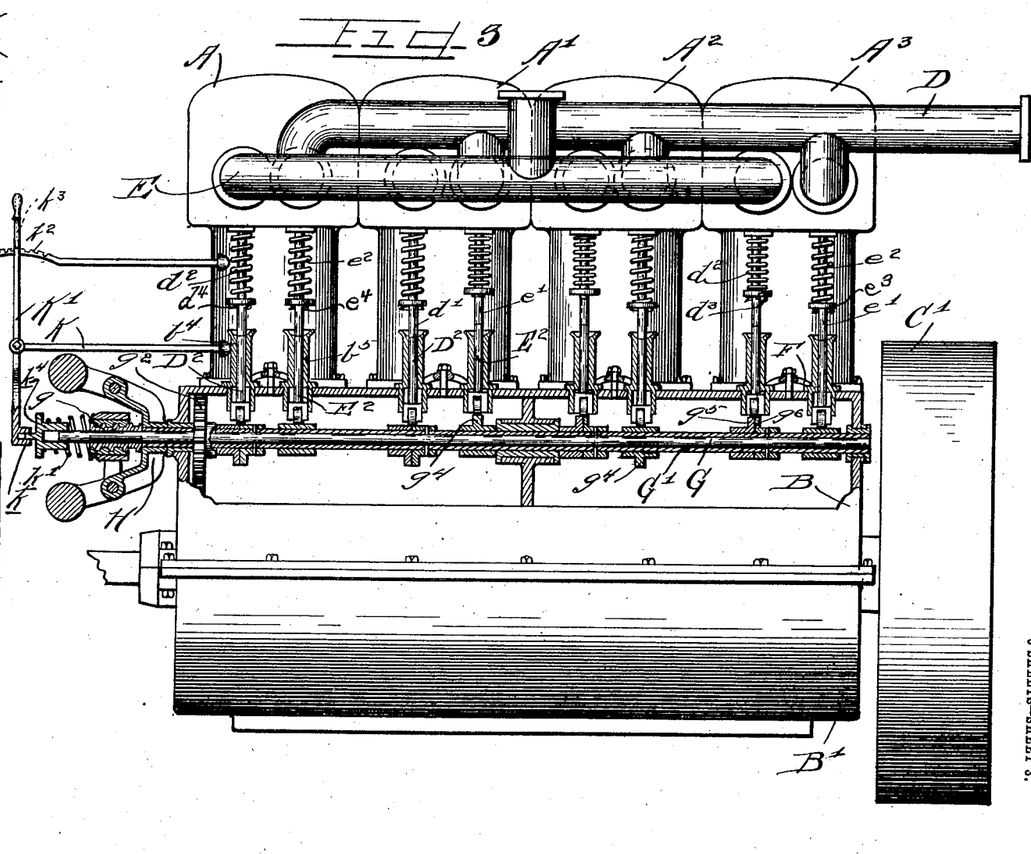
Fig. 3 is a section taken on line 3—3 of Fig. 2.
Figure 4:
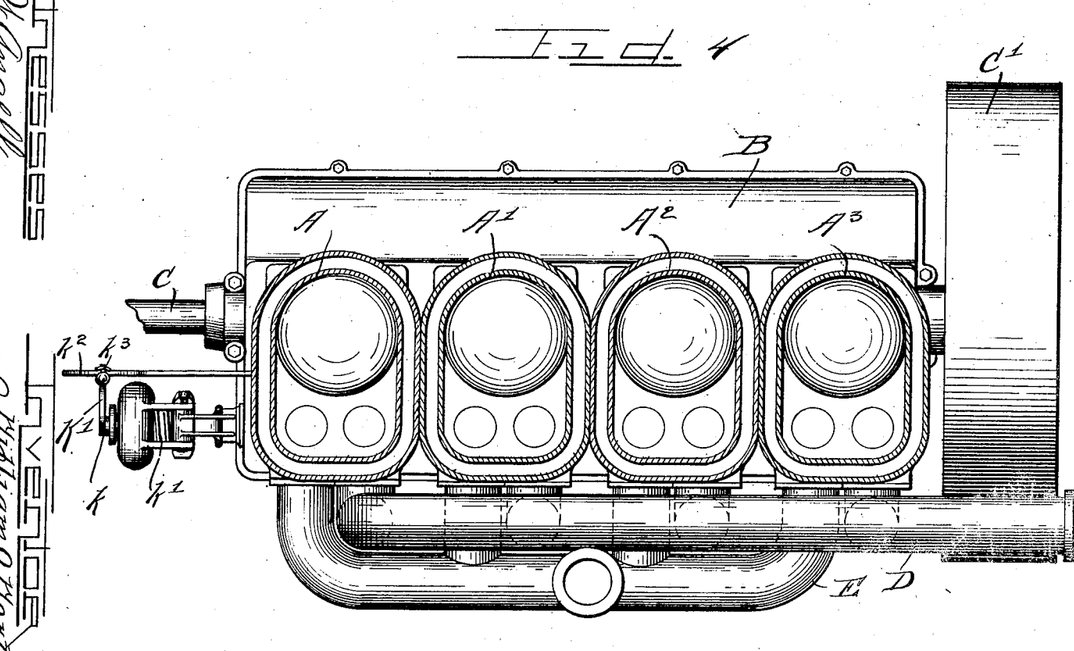
Fig. 4 is a horizontal section taken on line 4—4 of Fig. 2.

Extending longitudinally through the crank case and journaled in the ends thereof is a compound cam shaft. This shaft as shown, comprises an inner shaft G which extends through the bearings and outwardly at the end of the crank case opposite the balance wheel C' and rigidly secured thereon is a worm $g$ having a long thread. Extending through the bearings at each end of the crank shaft is a sleeve or tubular shaft G', which fits closely to the shaft G, and on which are rigidly secured one of the timing gears $g^2$ which meshes with a gear $g'$, journaled to mesh therewith and with a gear $g^3$ as shown in Fig. 1.

Figures 5, 6:
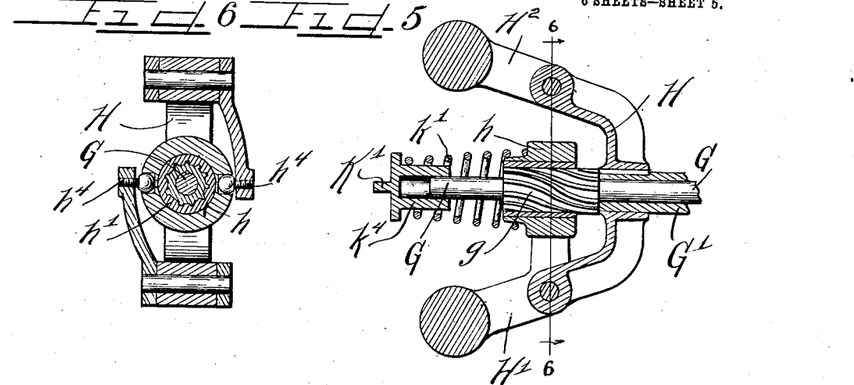
Fig. 5 is a longitudinal section of the governor.
Fig. 6 is a section taken on line 6—6 of Fig. 5.
Figure 7:
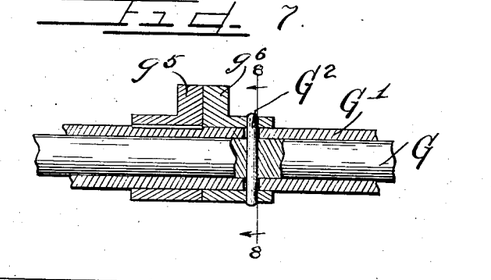
Fig. 7 is an enlarged longitudinal section of the cam shaft taken at one of the inlet valve cams.
Figure 8:
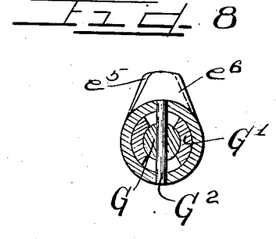
Fig. 8 is a section taken on line 8—8 of Fig. 7.
Figure 9:
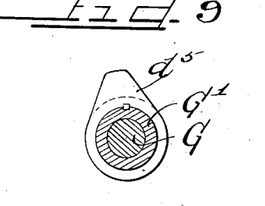
Fig. 9 is a transverse section of the cam shaft, taken at one of the exhaust cams.
Figure 10:
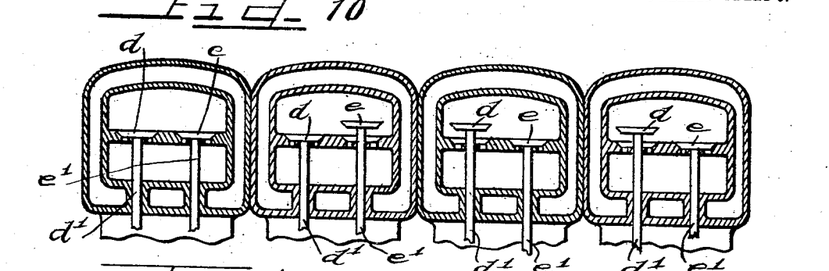
Figs. 10, 11, 12, and 13 illustrate the cycle of operation.
Figure 11:
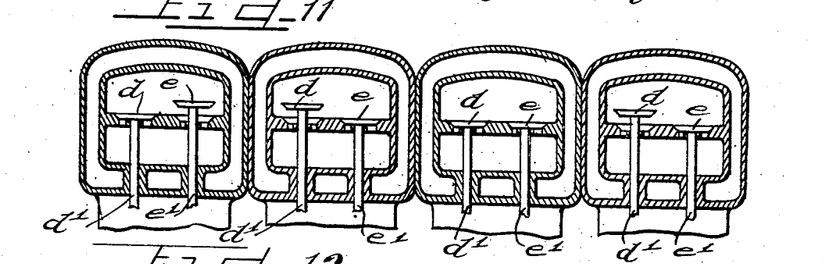
Figure 12:
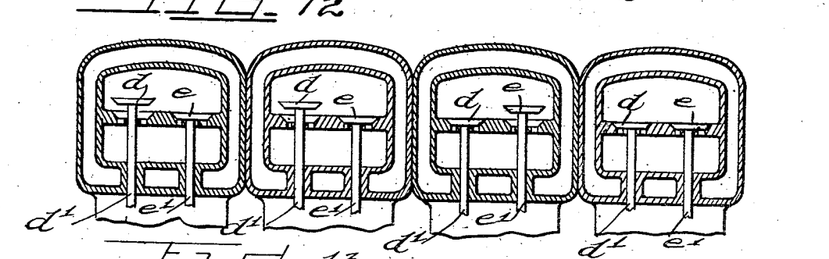
Figure 13:
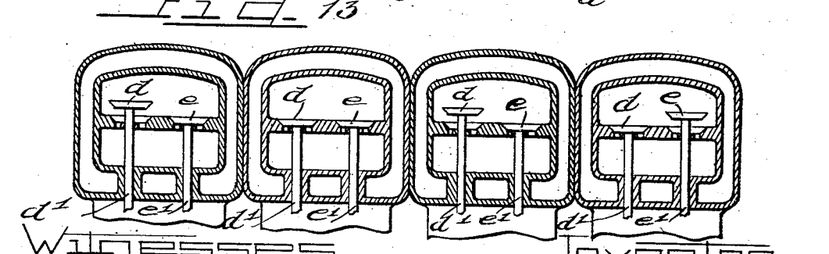

The exhaust cams $g^4$ are rigidly secured on said tubular shaft G', at the proper position to open the exhaust valve, at the proper time, by actuating the exhaust puppet rods. The inlet cams as shown, each comprise a cam $g^5$ rigidly secured on the sleeve, or tubular shaft G' and a corresponding cam $g^6$ facing against the same and rigidly secured to the shaft G. Said cam $g^6$ is rigidly engaged in place on the shaft G by means of a drift pin G² which extends through the collar of said cam and through the shaft G, and through transverse opposite slots in the tubular shaft G' as indicated in Fig. 8. So that said cams can move or rotate slightly relatively each other and can be brought together to afford quick closing of the inlet or can be separated to afford a relative long closing and to hold the inlet valve open for the length of time depending on the relative adjustment of the two members forming the inlet cam. Means are provided for regulating this adjustment automatically comprising a centrifugal governor. A yoke H, is rigidly secured on the tubular shaft G', with the arms directed toward the end thereof. A nut comprising an outer cylindric shell $h$, having a bushing $h'$, secured therein and threaded complementally with the worm $g$. Bent and weighted arms H'—H² are pivoted centrally at the outer ends of the yoke arms and at their inner ends oppositely engaged with the nut by means of bolts $h^4$, which are engaged to said arms and the rounded heads of which engage in seats in the sides of the nut. Movement of said arms on said yoke acts to shift the nut outwardly or inwardly thereby partly rotating the shaft G within the shaft G' and lengthening or shortening the bearing surface of the inlet cams varying the time of closing the valves. As shown, means are provided for resisting the outward movement of the nut on said worm and for varying the resistance of the nut for movement on said worm. For this purpose an arm K is secured on any rigid part of the motor and projects outwardly above the end of the cam shaft. Pivoted thereon is a lever K' the lower end of which is provided with an integral socket $k$ which carries a socketed bearing piece $k^4$ which fits on the end of the shaft G. A strong pushing spring $k'$ bears against the end of the nut which is shaped to receive the same and against the bearing as shown in Fig. 5, and the resistance may of course be varied by shifting the lever. Any suitable segment $k^2$ and detent $k^3$ may be employed to hold the lever in adjusted position.

The operation is as follows: The tubular shaft G' on which are the exhaust cams of course rotates without variation from its proper rate relatively the rate of the crank shaft. The shaft G', is rotated with the shaft G by means of the pin G² which extends through the slots in said shaft. As a result the cams $e^5$—$e^6$ coincide for their entire width and the inlet valves permit the corresponding cylinders to receive and retain the maximum charge. As the speed of rotation increases the governor acts to gradually shift the nut outwardly on the worm thus rotating the shaft G within the shaft G' and extending the inlet cam surface to hold one inlet valve open until the next inlet valve is opened thus displacing the mixture from a cylinder in which there would otherwise be an excess to one which receives the next charge thus economizing in the explosive and at the same time governing the engine.

Of course, the speed at which the relative movement or adjustment of the shafts occurs is determined by the adjustment of the lever K', which determines the adjustment of the spring $k'$. It is thus possible to run the motor at maximum speed and full charge if desired or at any desired rate of speed, inasmuch as increasing the resistance of the spring, resists the centrifugal movement of the weighted ends of the levers while decreasing the resistance permits the arms to swing outwardly more readily thus in the one case retaining full charge, high speed and in the other retaining on each cylinder, but a small part of the charge at relatively low speed.

Of course the valves may be of any suitable type and any means for graduating the resistance offered to the governor. I therefore do not purpose limiting this application for patent, otherwise than necessitated by the prior art, as obvious details of construction may be varied without departing from the principle of my invention.

I claim as my invention:

1. In a device of the class described the combination with a crank case of cylinders secured thereto, an inlet and an exhaust port for each cylinder, removable tubular casings adapted for engagement to the cylinders, clamps each adapted to secure the adjacent two casings in position, reciprocating valves for the ports having their stems extending through the casings, a peripherally extensible cam for each inlet port, a cam for opening each exhaust port and means for extending all inlet cams peripherally when the speed of the engine exceeds normal.

2. An engine embracing a plurality of cylinders each having an inlet and an outlet port, concentric shafts below the same, reciprocating valves for the ports, an inlet pipe communicating with all the inlet ports, sets of cams on the concentric shafts adapted to be relatively adjusted to retard the closing of the respective inlet ports, one cam of each set rigidly secured on the outer shaft, said outer shaft provided with oppositely disposed slots and means rigidly engaged to the inner of the concentric shafts, extending through said slots and rigidly securing the other cam of each set thereto, cams secured on one of the concentric shafts, one for actuating each exhaust valve and a centrifugal governor acting to relatively adjust the cams for the inlet valves to retard the closing thereof.

3. An engine embracing a casing, cylinders secured thereto, pistons in said cylinders, an inlet and an exhaust port for each cylinder, reciprocating valves controlling the inlet and exhaust ports, a tubular cam shaft journaled in the casing, a cam shaft journaled therein, said tubular shaft having sets of oppositely disposed notches therein, sets of cams on said shafts adapted to operate the inlet valves, one cam of each set secured to the tubular shaft, means secured to the inner cam shaft extending through the slots and adjustable therein adapted to secure the other cam of each set to said inner shaft thereby permitting relative adjustment of the cams to retard the closing of the inlet ports to permit displacement of part of the explosive mixture, cams secured on the tubular shaft, one for actuating each exhaust valve, a centrifugal governor adapted to adjust the inlet valve cams and means for adjusting the governor to a different speed rate while in operation.

4. In a device of the class described the combination with a crank casing of cylinders secured thereto, an inlet and an exhaust port for each cylinder, puppet valves controlling said ports, tubular casing adapted for engagement to the crank casing through each of which a valve stem extends, clamps removably securing the casings in place, a tubular shaft journaled in the casing, a shaft extending therethrough, a pair of cams for each inlet valve, one rigidly secured to each shaft, a cam for each exhaust valve rigidly secured on the tubular shaft, a centrifugal governor adapted to adjust the inlet cams relatively of each other to retard closing of the inlet valves, whereby a portion of the explosive mixture is displaced from one cylinder to another and means for adjusting the governor to vary the governing rate.

5. In an engine the combination with a crank case of cylinders secured thereto, inlet and exhaust ports in each cylinder, reciprocating valves for said ports, concentric cam shafts, pairs of cams secured thereon adapted to coact in opening the inlet valves and to hold the same open to regulate the charge to meet load requirements, cams on one of said shafts for opening the exhaust valves, a worm secured on the end of one shaft, a threaded shell thereon and a governor rotatable with said shafts adapted to adjust the shell thereby varying the peripheral length of the pairs of cams.

6. An explosive engine embracing a plurality of cylinders each having an inlet and an exhaust port, a reciprocating mechanically operated inlet valve controlling each inlet port, an inlet pipe on communication with all of said inlet ports except for said inlet valves, a tubular cam shaft, a cam shaft extending therethrough, a two part lifting cam for each inlet valve one of said parts being rigidly secured to the tubular shaft and the other secured to the other shaft by a pin extending therethrough and through oppositely disposed slots in the tubular shaft permitting relative movement thereof, an automatically acting centrifugal governor acting to adjust said parts of the cam to retard the closure of the inlet valves at the speeds above normal thereby permitting a displacement of the mixture from the cylinder about to be compressed to an adjacent cylinder, cams secured to one of said shafts for opening the exhaust valves regularly, and a lever for adjusting said governor to retard or accelerate the closing of said inlet valve.

7. In an engine of the class described having a plurality of cylinders each having an inlet and an exhaust port, of mechanically operated reciprocating valves controlling said ports, cam shafts one of which is tubular, lifting cams on each shaft arranged in pairs for operating said inlet valves, and being peripherally extensible, fixed cams on the tubular shaft for operating the exhaust valves, a governor connected with the tubular shaft, a worm rigidly secured on the inner shaft, means operatively connecting the governor and worm whereby movement of the governor out of normal actuates the worm to rotate the inner shaft relatively of the tubular shaft and acting to adjust the inlet cams to retard the closure of the inlet valves at speed rates above normal and means acting on the governor and the cam shafts to accelerate or to retard the closing of said valve.

8. In an engine of the class described having a plurality of cylinders, a reciprocating piston in each, an inlet and an exhaust port communicating in each cylinder, mechanically operating valves controlling said ports, cam shafts one of which is tubular, lifting cams thereon operating in pairs for opening the inlet valve, one of which is secured to the tubular shaft and the other secured to the other shaft by means extending through oppositely disposed slots in the tubular shafts, an independent cam for each exhaust valve secured on the tubular shaft, and a centrifugal governor for adjusting said inlet cams.

9. In a device of the class described the combination with a crank case of cylinders secured thereon, an inlet and an outlet port for each, puppet valves for said ports, a plurality of shafts secured in the crank case, means rigidly secured on one of said shafts for opening the exhaust valves, adjustable means secured on the shafts for opening the inlet valves and to retard closing thereof, a yoke secured to one of said shafts, a governor pivoted thereto connected with the other shaft to rotate the same relatively of the aforesaid shaft, a spiral spring acting against the throw of said governor to prevent relative movement of said shaft and means varying the tension of the spring exerted against the governor.

10. In a device of the class described the combination with cylinders of an inlet and an exhaust port for each, reciprocating valves for said ports, a tubular shaft, a shaft extending therethrough, complemental cams, one secured to the tubular shaft and one to the other shaft for operating the inlet valves, cams on one of said shafts adapted to regularly open the exhaust valves, a yoke rigidly secured on the tubular shaft, a governor pivoted to the yoke, a worm rigidly secured to the inner shaft, a shell threaded thereon, means connecting the governor and shell adapting the governor to move the shell longitudinally of the worm thereby rotating the worm and inner shaft relatively of the other to vary the peripheral distance of the complemental cams and mechanism adapted to control the relative movement of the shafts.

11. An explosive engine embracing cylinders, an inlet and an exhaust port for each, puppet valves therefor, a tubular cam shaft, a cam shaft concentric therewith, cams secured to said shafts in pairs adapted to actuate the inlet valves, independent cams on the tubular shaft for actuating the exhaust valves, a yoke secured to one shaft, a worm secured to the other shaft, a shell on the worm, a governor pivoted to the yoke and secured to the shell on opposite sides by universal joints, a spring on one of the shafts bearing against the shell and means for compressing the spring to vary the tension thereof.

12. In an explosive engine, the combination with cylinders each having an inlet and an exhaust port, of a puppet valve controlling each port, an inlet pipe communicating with all the inlet ports, means actuating said valves a shaft, means thereon actuating the exhaust valve without variation to open and close the exhaust port, a shaft extending parallel with the first named shaft, a governor secured to one of said shafts, longitudinally movable means on the other shaft, means operated thereby for rotating the last named shaft, operative connections between the governor and longitudinally movable means whereby the shafts are relatively adjustable by movement of the governor and adapting the inlet cams to open the inlet valves without variation and to close the same variably dependent upon speed and load condition.

13. In an engine of the class described the combination with the cylinders, pistons and crank shaft, of an inlet and an exhaust valve for each cylinder, a shaft for actuating said valves, a tubular shaft, a fixed lifting cam for the exhaust valve on the tubular shaft, an inlet lifting cam embracing a part fixed on said tubular shaft, transverse slots in said shaft adjacent said fixed part, a shaft rotatable in the tubular shaft a pin extending therethrough, through said slots and through the collar of a corresponding cam section, movable on the tubular shaft, and means partly rotating the inner shaft within said tubular shaft to extend the inlet cams peripherally.

14. In an engine of the class described the combination with cylinders and their pistons and crank shaft, of a puppet valve controlling each exhaust port and each inlet port, mechanical means for operating the same embracing a tubular cam shaft, driven at uniform rates with reference to the crank shaft and provided with fixed radially projecting lifting exhaust cams, cams for actuating the inlet valve embracing a fixed lifting portion rigidly secured on said shaft for each valve, a portion adjustable peripherally therewith, a rod or shaft extending through the tubular shaft, and on which the adjustable portion of each inlet cam is secured, a centrifugal governor acting on both shafts to rotate one relatively to the other to vary the length of the inlet cams peripherally and manually operated means for varying the action of the governor during the operation of the same.

15. A cam shaft for the purpose specified embracing a tubular shaft having lifting exhaust cams fixed thereon, a shaft rotative in said tubular shaft, lifting inlet cams embracing a part rigidly secured on the tubular and part rigidly secured on the inner shaft through slots in the tubular shaft, and facing against the portion on the tubular shaft, a centrifugal governor secured on the end of the tubular shaft, a worm on the outer end of the inner shaft, a nut operated by the governor and slidable on the worm to partly rotate said shafts relatively each other, a spring bearing against said governor and an actuating lever bearing against said spring and acting to vary the resistance against the movement of the nut thereby acting to vary the action of the governor in shifting the inlet cams.

16. In a device of the class described concentric cam shafts one of which is tubular, a fixed lifting cam on the tubular shaft for the exhaust valve, peripherally extensible pairs of inlet cams, one cam of each pair rigidly secured on the tubular shaft and the other cam of each pair on the other shaft by means extending through oppositely disposed slots in the tubular shaft which permit relative adjustment of the shafts, and means automatically adjusting the same.

In testimony whereof I have hereunto subscribed my name in the presence of two subscribing witnesses.

WILLIAM O. WORTH.

Witnesses:
K. E. HANNAH,
J. W. ANGELL.